UNITED STATES PATENT OFFICE.

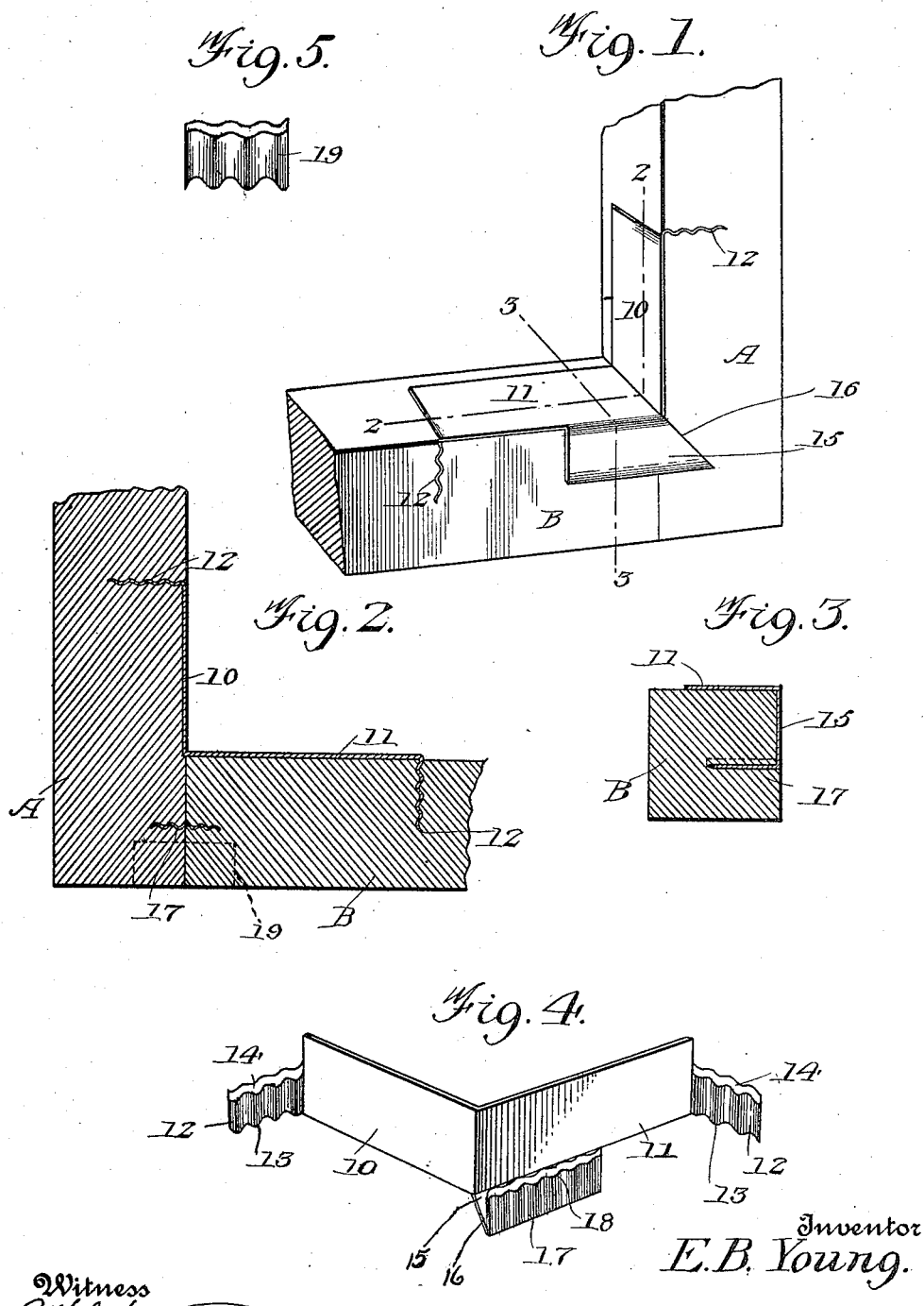

EDWARD B. YOUNG, OF HARTVILLE, MISSOURI.

ANGLE OR CORNER BRACE.

1,320,303.  Specification of Letters Patent.  Patented Oct. 28, 1919.

Application filed July 6, 1918. Serial No. 243,624.

*To all whom it may concern:*

Be it known that I, EDWARD B. YOUNG, a citizen of the United States, residing at Hartville, in the county of Wright and State of Missouri, have invented new and useful Improvements in Angle or Corner Braces, of which the following is a specification.

This invention relates to corner braces for joints and is especially adapted for use in connection with frames for windows or door screens and the like.

An object of the invention is to provide a brace which may be stamped from a single sheet of metal and formed to provide angularly disposed bearing plates designed to engage the inner edges of the joint, said plates each having located at their outer ends angularly disposed corrugated joint engaging elements capable of insertion within the face of the joint, a face plate formed on one of the bearing plates at the point of juncture of said bearing plates, said face plate extending beyond the plane of the other bearing plate and having an angularly disposed engaging element formed thereon for engagement with both members of the joint.

In the drawings,

Figure 1 is a perspective view of a joint provided with a corner plate embodying the present invention;

Fig. 2 is a sectional view on the line 2—2 of Fig. 1;

Fig. 3 is a sectional view on the line 3—3 of Fig. 1, this section being taken transversely through one of the joint members;

Fig. 4 is a perspective view of the brace; and

Fig. 5 is a similar view of a corrugated metal fastener, which may be used in connection with the brace.

Referring to the drawings in detail, similar characters of reference denote corresponding parts throughout the several views.

The form of the invention illustrated in the accompanying drawings comprises bearing plates 10 and 11 which are disposed at substantially a right angle to one another and are formed from a single piece of sheet metal. These plates are preferably elongated in shape and are of a width to extend substantially across the inner edges of the joint members A and B, with which they are designed to contact. Formed upon the outer end of each of the bearing plates and extending substantially at right angles thereto are engaging elements, preferably in the form of extensions 12, the width of which is approximately one-half the width of the plates 10 and 11, so that the said extensions 12 may be forced into the face of the plates A and B, until their edges 13 which are flush with the edges of the bearing plates 10 and 11 are also flush with the face of the joint members into which they are inserted. The extensions 12 are transversely corrugated as shown, the edge opposite the edge 13 providing entering points 14, to facilitate the application of the brace.

In addition to these extensions 12, the bearing plate 11 is formed with a plate 15, which is located along the edge of the said plate 11 and is disposed at right angles thereto. This plate 15 is also located at the juncture of the plates 10 and 11. One end 16 of the plate 15 is outwardly inclined or beveled, so as to extend beyond the plane of the bearing plate 10, so that when the brace is positioned upon the joint, this plate will lie against the faces of both of the joint members A and B, extending across the seam formed by the engagement of these two members. Formed upon the edge of the plate 15 and bent at right angles thereto, so as to aline the bearing plate 11, is an engaging element 17, which is corrugated transversely as shown and is also beveled providing an entering point 18, similar to the points 14 described in connection with the extensions 12. The engaging element 17 extends throughout the length of the longitudinal edge of the plate 15, so that when the brace is inserted to clamp a joint, this element will enter both members A and B of the joint to aid in securely holding them together.

If desired, corrugated metal fasteners 19, similar to the ones illustrated in Fig. 5, may be inserted in the top edges in a manner to permit both members of the joint to aid in holding them together.

It is believed that from the foregoing description when taken in connection with the accompanying drawings, the construction, operation and advantages of the invention will be apparent. The right is reserved to make such changes in the form and proportion thereof as will fall within the scope of the claims hereto appended.

Having described the invention, what is claimed is:

1. A corner brace of the character described comprising right angularly disposed bearing plates adapted to contact with the inner edges of the joint, angularly disposed extensions formed upon the outer ends of said plates and capable of entering the face of the joint, a right angularly disposed face plate carried by one of said plates and an engaging element carried by said face plate for engagement with both members of the joint.

2. A corner brace of the character described comprising angularly disposed bearing plates adapted to contact with the inner edges of the joint, angularly disposed extensions formed upon the outer ends of the said plates and capable of entering the face of the joint, a right angularly disposed face plate carried by said brace and an engaging element carried by the face plate, said element extending parallel to one of the bearing plates for engagement with both members of the joint.

3. A corner brace of the character described comprising angularly disposed bearing plates adapted to contact with the inner edges of the joint, angularly disposed extensions formed upon the outer ends of said plates and capable of entering the face of the joint, a right angularly disposed face plate carried by one of said plates and a corrugated engaging element carried by the face plate for engagement with both members of the joint.

4. A corner brace of the character described comprising a brace cut from a single piece of sheet metal and shaped to provide angularly disposed bearing plates designed to engage the inner edges of the joint, angularly disposed corrugated joint engaging elements formed upon the outer ends of each of said plates and capable of insertion within the face of the joints, a face plate formed on one of the bearing plates at the point of juncture of said plates, said face plate extending beyond the plane of the other bearing plate and an angularly disposed corrugated engaging element formed on said face plate and parallel to one of said bearing plates.

In testimony whereof I affix my signature.

EDWARD B. YOUNG.

Copies of this patent may be obtained for five cents each, by addressing the "Commissioner of Patents, Washington, D. C."